United States Patent [19]

Korrect et al.

[11] Patent Number: 4,671,378
[45] Date of Patent: Jun. 9, 1987

[54] GEAR SHIFT LEVER MECHANISM

[75] Inventors: Steven G. Korrect; Robert L. Kaukaskie, both of Dubuque, Iowa

[73] Assignee: Deere & Co., Moline, Ill.

[21] Appl. No.: 821,403

[22] Filed: Jan. 21, 1986

[51] Int. Cl.[4] ............................................. B60K 20/00
[52] U.S. Cl. .................................. 180/336; 74/471 XY
[58] Field of Search .............. 180/315, 327, 333, 336; 74/471 XY, 471 R, 473 R, 473 P, 477

[56] References Cited

U.S. PATENT DOCUMENTS

| 2,917,941 | 12/1959 | Wittren . | |
|---|---|---|---|
| 3,242,758 | 3/1966 | Harris et al. . | |
| 3,292,450 | 12/1966 | Hurst et al. . | |
| 3,939,733 | 2/1976 | Wetrich . | |
| 3,993,175 | 11/1976 | Beveridge | 74/471 XY |
| 4,027,547 | 6/1977 | Rahman et al. | 74/471 XY |
| 4,060,157 | 11/1977 | Hillstrom . | |
| 4,169,443 | 10/1979 | Todeschini | 74/471 XY |
| 4,228,879 | 10/1980 | Woodbury . | |

FOREIGN PATENT DOCUMENTS

| 2746403 | 4/1978 | Fed. Rep. of Germany | 180/333 |
|---|---|---|---|
| 637097 | 4/1928 | France | 180/333 |

Primary Examiner—John J. Love
Assistant Examiner—Kenneth R. Rice
Attorney, Agent, or Firm—Henderson & Sturm

[57] ABSTRACT

The present invention relates to a mechanism for maintaining a gear shift control lever in a neutral position against inadvertent and accidental movement. The mechanism includes a control lever unit movable in a first plane to effect operation of a cable connected to the vehicle transmission direction control valve. The control lever is also movable in a second plane normal to the first plane but with linkage effecting lost motion in the second plane movement with respect to the transmission direction control valve cable. A bracket mounted side-by-side with the control lever linkage is operably connected to the transmission gear selector valve and has a lost motion connection with the control lever such that the bracket is moved only upon movement of the control lever in the second plane. The bracket tends to retain the control lever in the neutral position; and in combination with a face plate through which the control lever extends, and a biasing unit mounted between the lever unit and the bracket, the control lever is firmly held in a neutral position slot formed in the face plate.

9 Claims, 3 Drawing Figures

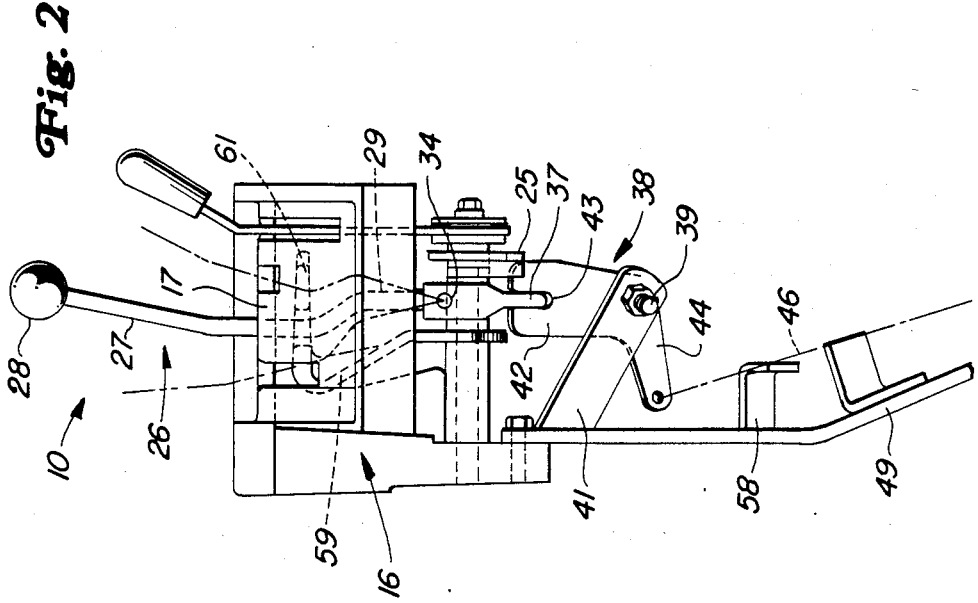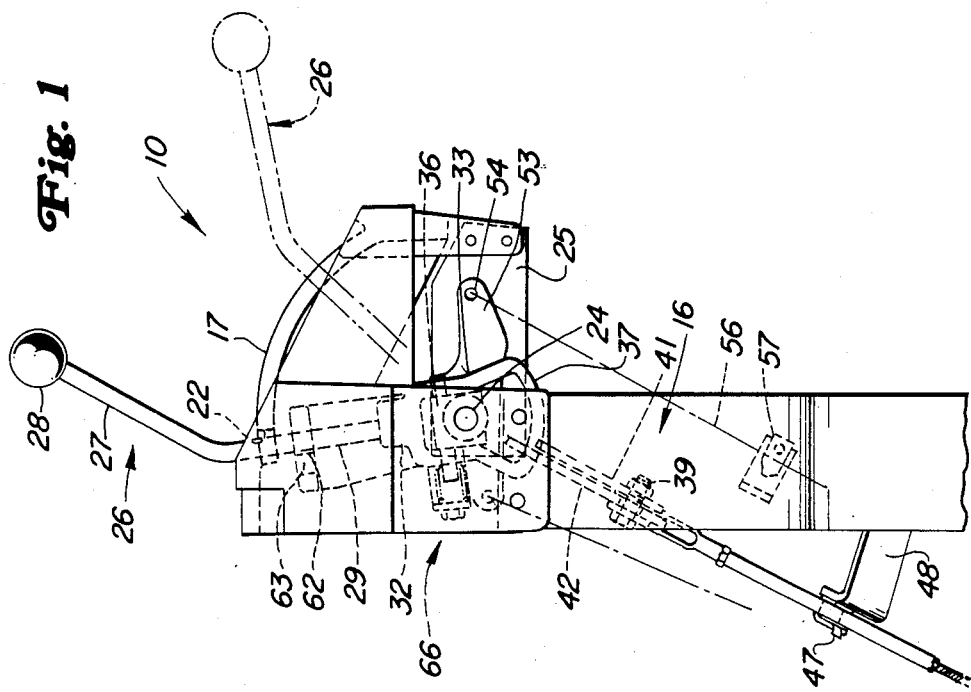

GEAR SHIFT LEVER MECHANISM

TECHNICAL FIELD

This invention relates generally to controls for vehicles and in particular to mechanisms for maintaining a gear shift control lever in a neutral position against inadvertent or accidental movement of the lever by the operator, or due to operation of the vehicle.

BACKGROUND ART

For the safety of the operator of any wheeled vehicle using a gear shift lever, and for the effective use of the vehicle, it is very important that the gear shift control mechanism provide for maintaining the gear shift lever in a neutral position such that the transmission does not operate. This is true particularly with hydraulic transmissions where at times even a small amount of movement of the control lever will cause enough shifting of a spool valve to permit fluid movement of eventual sufficiency to effect unintended operation of the transmission.

Various latching devices and the like have been devised to lock the gear shift control lever into a neutral position, and one arrangement ties the control lever to the parking brake such that the gear shift lever cannot be moved out of the neutral position without releasing the parking brake.

Those concerned with this type of problem recognize the need for an improved mechanism for retaining the gear shift control lever for a hydraulically operated transmission in a neutral position when placed therein by the operator.

DISCLOSURE OF THE INVENTION

The present invention relates to a mechanism for maintaining a gear shift control lever in a neutral position against inadvertent and accidental movement by either the operator or by the hydraulically operated transmission to which the shift lever is connected.

The gear shift control mechanism comprises a housing unit having a face plate with forward, reverse and neutral slots formed therein, which slots are parallel and are connected across common ends by a transverse passage; a pivot shaft mounted on the housing unit and disposed with its axis generally parallel to the face plate; a control lever which extends through any one of the slots, movable through all three and across the transverse passage, with one end of the control lever extended above the face plate for engagement by the operator and the other end extended below; a bell shaped, open yoke which is connected to the lower end of the control lever and which is pivotally mounted on the pivot shaft for simultaneous movement in a first plane normal to the axis of the pivot shaft and in a second plane parallel to that axis, with movement of the lever within either one of the forward or reverse slots causing the yoke to move in its first plane, with movement of the control lever across the transverse passage causing the yoke means to move within the second plane; a bell crank pivotally mounted on the housing means and operably connected to the yoke and to a transmission direction control valve at the transmission, the bell crank movable in response to movement of the yoke in the second plane thereof, the direction control valve cable connection tending to retain the control lever in any of the positions moved thereto by the operator, the transmission remaining in neutral when the control lever is located in any position along the transverse passage; a bracket which is pivotally mounted on the shaft adjacent the yoke and which includes a pair of arms, one arm operably engaged with the transmission gear selector valve whereby pivotal movement of the bracket means is operable to move via the cable the gear selector valve into a detent-held gear selected condition, with the second arm extended parallel to and disposed below the face plate, the second arm having a slot formed therein which is vertically alignable with the transverse passage such that movement of the control lever across the transverse passage effects a lost motion connection with the bracket second arm, but wherein movement of the control lever in either of the forward or reverse slots effects simultaneous movement of the bracket to thereby operate the gear selector valve.

The slot formed in the second arm has a cut-out formed centrally thereof which is alignable with the neutral slot formed in the face plate such that the control lever can be moved into the neutral slot of the face plate again without effecting movement of the bracket second arm. A biasing unit is mounted between the bracket and the yoke to bias the control lever into the neutral slot such that when the control lever is placed in the neutral slot by the operator, the biasing means maintains the lever in the neutral slot in a firmly engaged condition. Movement of the control lever out of the neutral slot by the operator must be effected against the force of the biasing unit.

It is an object of this invention to provide an improved mechanism for maintaining a gear shift control lever for a hydraulically operated transmission in a neutral position.

Yet another object of this invention is to provide a mechanism for maintaining a gear shift control lever in a neutral position wherein a spring actuated biasing unit is provided for continually forcing the gear shift control lever into the neutral position.

Still another object of this invention is to provide a mechanism for maintaining a gear shift control lever in first a neutral position for both the direction control and gear selector valves, and secondly for either the direction control and gear selector valves, and wherein a gear selector bracket arm having a lost motion connection with the gear shift lever aids in maintaining the gear shift lever in its neutral positions.

BRIEF DESCRIPTION OF THE DRAWINGS

These and other attributes of the invention will become more clear upon a thorough study of the following description of the Best Mode for Carrying Out the Invention, particularly when reviewed in conjunction with the drawings, wherein:

FIG. 1 is a side-elevational view of the gear shift lever mechanism of this invention, a gear shift lever thereon shown in two select positions;

FIG. 2 is a front elevational view of the mechanism of FIG. 1, and wherein the lever mechanism is in a transverse direction as indicated.

BEST MODE FOR CARRYING OUT THE INVENTION

Figure 3:
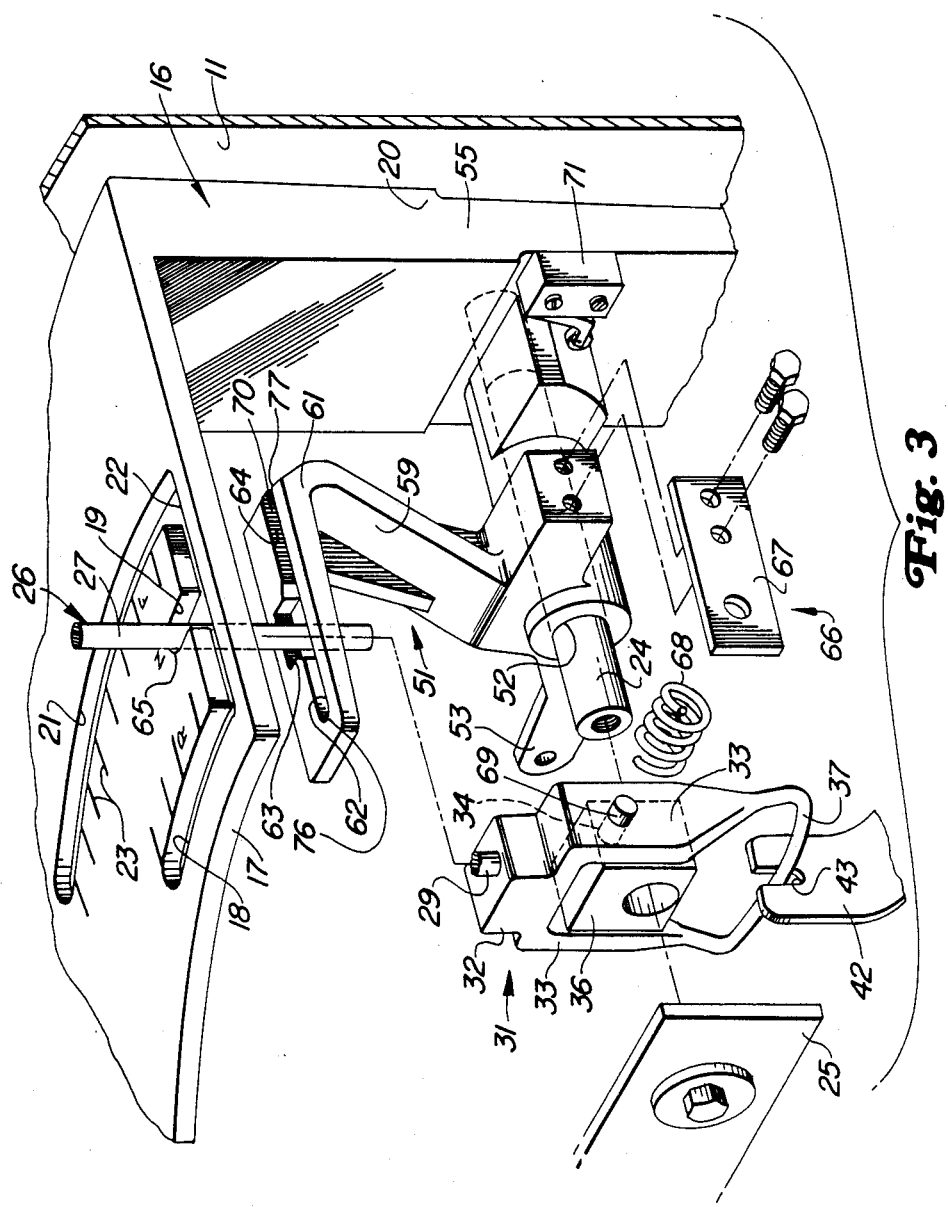
FIG. 3 is an enlarged side perspective view, partly broken for clarity, of the gear shift lever mechanism.

Referring now to the drawings, the gear shift lever mechanism is indicated generally at (10) in FIG. 1 and is secured to the wall (11) and floor (12) of the operator's station or cab to the right of the operator's seat (not shown) so as to be convenient for operation by the operator. The mechanism (10) comprises a housing unit (16) with a face plate (17) having a reverse slot (18), a neutral slot (19) and a forward slot (21) formed therein, with a transverse passage (22) connected across common ends of the parallel slots (18), (19) and (21), such that the slots are all interconnected. Direction indicia, such as "F" at the base of the forward slot (21), "R" at the base of the reverse slot (18) are formed on the face plate (17), with "N" also formed thereon to indicate the neutral condition of the hydraulically operated transmission (not shown); and spaced longitudinally of both direction control slots "F" and "R", namely slots (21) and (18), respectively, gear selector indicia (23) is formed in an embossed manner on the face plate (17), with appropriate numerals indicating the gear selection of the transmission at that particular location along a respective slot (18) and (21).

A pivot shaft (24) is secured at one end to the housing unit (16) and at its outer end to a bracket (25) secured to a forward end (20) of the housing unit (16). The pivot shaft (24) axis is disposed generally parallel to the transverse disposition of the face plate (17) and normal to the longitudinal extent of the slots (18), (19) and (21) for a purpose seen hereinafter.

A control lever (26) is provided for effecting operation of the hydraulic transmission of the vehicle, and includes an upper exposed end (27) with a knob (28) mounted thereon for manipulation by the operator, and includes further a lower depending end (29) disposed below the face plate (17). It is to be noted that when the control lever (26) is located at any position along the transverse passage (22), both the transmission direction control and gear selector valves (not shown) are in a neutral condition, as more clearly understood hereinafter.

A bell-shaped, open yoke (31) is included which has an upper end (32) connected to the lower end (29) of the control lever (26), includes spaced sides (33) having a pin (34) extended therethrough, which pin (34) is mounted in a block (36) for pivotal movement on the pivot shaft (24). The yoke (31) further includes a lower, closed loop end (37). The pivotal mounting of the yoke (31) on the pivot shaft (24) by the block (36) provides for simultaneous movement of the yoke (31) in a first plane extended normal to the axis of the pivot shaft (24), and in a second plane extended parallel to the pivot shaft (24) axis. Movement of the control lever (26) within said transverse passage (22), the transverse passage (22) extended parallel to the axis of the pivot shaft (24), causes the yoke (31) to move within the second plane parallel to the axis of the pivot shaft (24); whereas movement of the control lever (26) in either of the slots (18), (19) or (21) effects movement of the yoke (31) in the first plane.

A bell crank (38) is pivotally mounted by a connection (39) to a bracket (41) on the housing unit (16), an upper U-shaped arm (42) of the bracket (41) having a slot (43) formed therein, which slot (43) receives the loop end (37) of the yoke. The bell crank (38) includes further a lower end (44) connected to an upper end of a cable (46) operably connected to the transmission direction control valve (not shown) of the vehicle transmission. The cable is movably connected to a clamp (47) granted on a bracket (48) connected in turn to a portion (49) of the housing unit (16). The bell crank (38) and thus the transmission direction control cable (46) is movable in response to movement of the yoke (31) in the second plane thereof parallel to the axis of the pivot shaft (24) due to engagement of the loop end (37) with the bell crank arm (42), thus pivoting the arm (42) about its bracket connection (39) and either raising or lowering the cable (46). Conversely, movement of the bell crank (38) is not effected by movement of the yoke (31) in the first plane normal to the pivot shaft (24) axis due to the loop end (37) moving through the slot (43) of the bell crank (38) in a lost motion manner. The purpose of this arrangement will be seen hereinafter.

A gear selector bracket (51) having a bore (52) formed therein is pivotally mounted on the shaft (24) adjacent the block (36) for the yoke (31), and between the block (36) and a downwardly extended portion (55) of the housing unit (16). The bracket (51) includes a first arm (53) extended radially as from the pivot shaft (24) and connected at (54) to the upper end of a cable (56) operably connected to the transmission gear selector valve (not shown) of the transmission. The cable (56) extends through clamp (57) mounted on a bracket (58) secured in turn to the lower portion (49) of the housing unit (16). A second arm (59) of the bracket (51) extends radially as from the pivot shaft (24), which second arm (59) has an upper member (61) extended parallel to and disposed closely below the face plate (17). The upper member (61) of the second arm (59) has a slot (62) formed therein which extends transversely of the second arm (59), with the slot (62) having a cut-out (63) formed centrally and along the forward edge (64) thereof.

Referring to FIG. 2, it will be seen that when the upper member (61) of the second arm (59) is placed directly below the face plate (17), the slot (62) may be vertically aligned with the transverse passage (22) such that the control lever (26) is movable transversely back and forth through both the transverse passage (22) and the second arm slot (62). Further, at the neutral slot (19), the control lever (26) is movable forwardly out of the transverse passage (22) and into the neutral slot (19) until it engages the forward end (65) of the neutral slot (19) in the face plate (17). At this position of the control lever (26), it is moved into the cut-out (63) portion of the slot (62) formed in the second arm upper member (61), whereby engagement by the control lever (26) of the gear selector bracket (51) has not occurred.

It will be further noted when the slot (62) of the gear selector bracket (51) is vertically aligned with the transverse passage (22) of the face plate (17), that the forward transverse edge (70) of the slot (62) blocks movement of the control lever (26) out of the transverse passage (22) and into either of the forward or reverse slots (21) and (18), respectively. It is to be noted further that the function of both the direction control cable (46) and the transmission gear selector cable (56) are such that they tend to maintain the elements with which they are connected in an operator selected position of the control lever (26).

To bias the control lever (26) from the transverse passage (22) toward and into the neutral slot (19), a biasing unit (66) is provided which includes a bracket arm (67) secured to the gear selector bracket (51), a spring (68) centered about a stud (69) mounted on one side (33) of the yoke (31), the spring engaging both the bracket arm (67) and the yoke (31). Thus, when the control lever (26) is centered within the vertically aligned transverse passage (22) and gear selector slot (62), it is movable forwardly into the cut-out (63) by virtue of the biasing unit (66), without action by the operator. As the fore and aft width of the slot ends (76) and (77) are but slightly greater than the diameter of the control lever (26), movement of the control lever (26) forwardly or rearwardly within either forward or reverse slots, (21) or (19), not only causes movement of the yoke (31), but also effects movement of the bracket (51). Movement of the bracket (51) about the pivot shaft (24) results in like movement of the gear selector valve cable (56), as determined by the placement of the gear shift lever (26) by the operator. However, the movement of the yoke (31) does not result in change or operation of the direction control cable (46) due to the lost motion connection of the yoke (31) with the bell crank (38).

A switch (71) may be provided, mounted on a bracket (72) to the housing unit (16) and with an actuator arm (73) engageable with the bracket (51) at a predetermined location thereof. The switch (71) may be connected to visible and/or audible signal devices for indicating movement of the vehicle.

Obviously, many modifications and variations of the present invention are possible in light of the above teachings. It is therefore to be understood that, within the scope of the appended claims, the invention may be practiced otherwise than as specifically described.

We claim:

1. In a vehicle having an operator's station and a hydraulically operated transmission having a direction control valve and a gear selector valve, gear shift control mechanism comprising:

housing means having a face plate with forward, reverse and neutral slots formed therein, which slots are connected across common ends thereof by a transverse passage;

stationary pivot means mounted on said housing means and disposed with the axis thereof generally parallel to said face plate;

a control lever extended through one of said slots with one end above said face plate for engagement by the operator and the other end extended below said face plate;

yoke means connected to said control lever other end and pivotally mounted on said pivot means for simultaneous movement in a first plane normal to said pivot means axis and in a second plane parallel thereto, movement of said lever within one of said slots causing said yoke means to move in said first plane, and movement of said lever within said transverse passage causing said yoke means to move within said second plane;

bell crank means operably connected to said yoke means and to the transmission direction control valve, said bell crank means movable in response to movement of said yoke means in said second plane, said direction control valve connection tending to retain said control lever in its operator adjusted position, the transmission remaining in neutral when said control lever is located at any position in said transverse passage;

gear selector bracket means pivotally mounted on said pivot means for pivoting movement independently of said yoke means and including a pair of first and second arms, said first arm operably engaged with the transmission gear selector valve whereby pivotal movement of said bracket means is operable to the gear selector valve into a detent-held gear selected condition, said second arm extended parallel to and disposed below said face plate, said second arm having a slot formed therein vertically alignable with said transverse passage for receiving said control lever, and having further an edge of said slot blocking movement of said control lever out of said transverse passage only toward either said forward and reverse slots, said second arm responsive to movement of said control lever against said edge, and within either said forward or reverse direction slots to move said first arm and to thereby operate the gear selector valve; and means biasing said control lever into said neutral slot and into engagement with said face plate.

2. The invention of claim 1 and further wherein said slots are parallel each other, with said transverse passage extended normal to said slots.

3. The invention of claim 1 and further wherein said yoke means includes an open bell-like element embracing said pivot means.

4. The invention of claim 1 and further wherein said yoke means moves in one plane only, responsive to movement of said control lever in any one of said slots, and responsive separately to movement of said control lever in said transverse passage.

5. The invention of claim 1 and further wherein said bell crank means has a U-shaped member embracing said yoke means and engaged only by said yoke means moving either direction in said second plane.

6. The invention of claim 1 and further wherein said gear selector bracket means second arm has a cut-out formed in said slot thereof alignable with said neutral slot whereby movement of said control lever into said neutral slot is unrestricted by said second arm.

7. The invention of claim 1 and further wherein said biasing means has insufficient force to overcome the retention of said control lever in either the forward neutral position or the reverse neutral position when in said transverse passage, whereby said bracket means second arm blocking condition is overcome only to movement of said control lever by the operator against said second arm, said resulting movement of said bracket means operating said gear selector valve.

8. The invention of claim 7 and further wherein movement of said control lever in either said forward or reverse slot toward the neutral end thereof at said transverse passage effects movement of said bracket means second arm.

9. The invention of claim 1 and further wherein a switch unit is mounted on said housing means and is engageable by said bracket means on movement of said control lever within either of said forward or reverse gear selector slots, said engagement activating said switch unit to cause a signal to be emitted therefrom or indicating movement of the vehicle.

* * * * *